(12) United States Patent
Ehara

(10) Patent No.: US 11,137,960 B2
(45) Date of Patent: Oct. 5, 2021

(54) METHOD OF CONTROLLING INFORMATION PROCESSING APPARATUS AND COMMUNICATION APPARATUS

(71) Applicant: CANON KABUSHIKI KAISHA, Tokyo (JP)

(72) Inventor: Jun Ehara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/079,217

(22) Filed: Oct. 23, 2020

(65) Prior Publication Data

US 2021/0132878 A1    May 6, 2021

(30) Foreign Application Priority Data

Oct. 30, 2019 (JP) .............................. JP2019-197981

(51) Int. Cl.
    *G06F 15/00*    (2006.01)
    *G06F 3/12*     (2006.01)
    *G06K 1/00*     (2006.01)
    *H04W 48/16*    (2009.01)

(52) U.S. Cl.
    CPC .......... *G06F 3/1236* (2013.01); *G06F 3/1204* (2013.01); *G06F 3/1226* (2013.01); *H04W 48/16* (2013.01); *G06F 3/1292* (2013.01)

(58) Field of Classification Search
    CPC .... G06F 3/1236; G06F 3/1204; G06F 3/1226; G06F 3/1292; H04W 48/16
    USPC .............................. 358/1.15, 1.1, 1.13, 1.14
    See application file for complete search history.

(56) References Cited

U.S. PATENT DOCUMENTS

| | | | |
|---|---|---|---|
| 2017/0265194 A1* | 9/2017 | Ogawa | H04W 76/14 |
| 2018/0332634 A1* | 11/2018 | Kawaura | G06F 3/122 |
| 2019/0053137 A1* | 2/2019 | Watanabe | H04W 40/244 |

FOREIGN PATENT DOCUMENTS

JP    2013162382 A    8/2013

\* cited by examiner

*Primary Examiner* — Douglas Q Tran
(74) *Attorney, Agent, or Firm* — Canon U.S.A., Inc. IP Division

(57) ABSTRACT

A control method includes transmitting, based on reception of a predetermined operation a first command to cause a communication apparatus to search for a predetermined access point using at least one communication channel including a communication channel used by the predetermined access point among a plurality of communication channels available for use by the communication apparatus and without using at least one other communication channel other than the at least one communication channel among the plurality of communication channels available for use by the communication apparatus, the predetermined access point being connected to an information processing apparatus at least when the predetermined operation is received.

20 Claims, 6 Drawing Sheets

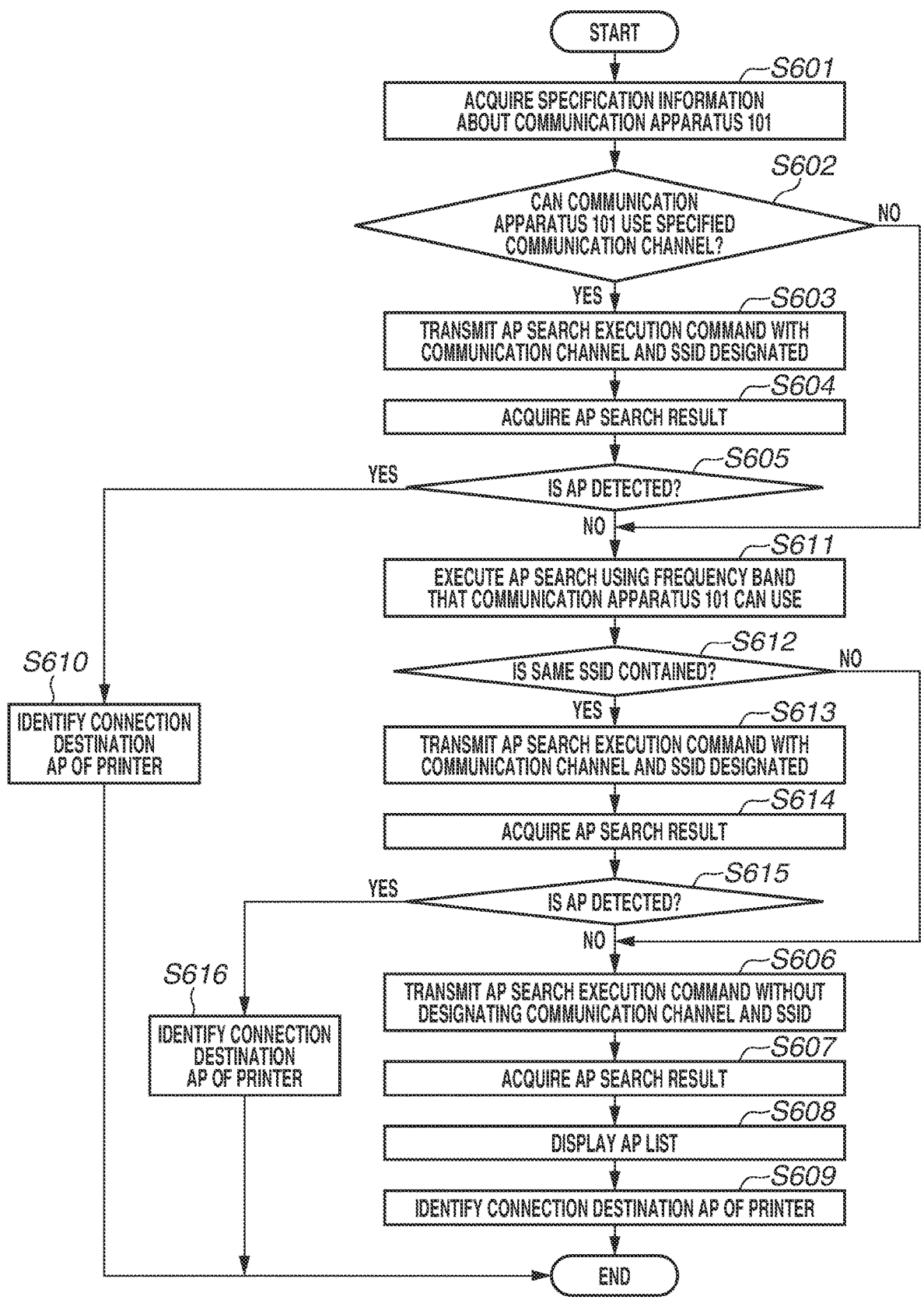

METHOD OF CONTROLLING INFORMATION PROCESSING APPARATUS AND COMMUNICATION APPARATUS

BACKGROUND OF THE INVENTION

Field of the Invention

The present invention relates to methods of controlling an information processing apparatus and communication apparatuses.

Description of the Related Art

A technique for executing network setting processing to establish a connection between a communication apparatus and an access point is known (refer to Japanese Patent Application Laid-Open No. 2013-162382).

Meanwhile, there have been an increasing number of apparatuses configured to execute processing to establish a connection between a communication apparatus and an access point, and this gives rise to demands for more appropriate execution of processing to establish a connection between a communication apparatus and an access point.

The present invention is directed to a technique for more appropriate execution of processing to establish a connection between a communication apparatus and an access point.

SUMMARY OF THE INVENTION

According to an aspect of the present invention, a method of controlling an information processing apparatus configured to communicate with a communication apparatus includes receiving a predetermined operation from a user, transmitting, based on the reception of the predetermined operation a first command to cause the communication apparatus to search for a predetermined access point using at least one communication channel including a communication channel used by the predetermined access point among a plurality of communication channels available for use by the communication apparatus and without using at least one other communication channel other than the at least one communication channel among the plurality of communication channels available for use by the communication apparatus, the predetermined access point being connected to the information processing apparatus at least when the predetermined operation is received, transmitting a second command to cause the communication apparatus to search for one or more access points near the communication apparatus using at least the at least one other communication channel in a case where the predetermined access point is not detected by a search executed by the communication apparatus based on the first command, and performing control so that in a case where the predetermined access point is detected by the search executed by the communication apparatus based on the first command, the predetermined access point and the communication apparatus are connected, whereas in the case where the predetermined access point is not detected by the search executed by the communication apparatus based on the first command, one of at least one access point detected by a search executed by the communication apparatus based on the second command and the communication apparatus are connected.

According to another aspect of the present invention, a communication apparatus configured to communicate with an information processing apparatus includes a reception unit configured to receive information about a predetermined access point from the information processing apparatus, the predetermined access point being connected to the information processing apparatus at least when the information processing apparatus receives a predetermined operation from a user, a first search unit configured to execute first search processing to search for the predetermined access point using at least one communication channel including a communication channel used by the predetermined access point among a plurality of communication channels available for use by the communication apparatus and without using at least one other communication channel other than the at least one communication channel among the plurality of communication channels available for use by the communication apparatus in a case where information about the predetermined access point is received, a second search unit configured to execute second search processing to search for at least one access point near the communication apparatus using at least the at least one other communication channel in a case where the predetermined access point is not detected by the first search processing, and an establishment unit configured to establish a connection between the predetermined access point and the communication apparatus in a case where the predetermined access point is detected by the first search processing, or establish a connection between one of at least one access point detected by the second search processing and the communication apparatus in the case where the predetermined access point is not detected by the first search processing.

Further features of the present invention will become apparent from the following description of exemplary embodiments with reference to the attached drawings.

BRIEF DESCRIPTION OF THE DRAWINGS

FIG. 6 is a flowchart illustrating a process of identifying an AP that is a connection destination of the communication apparatus.

DESCRIPTION OF THE EMBODIMENTS

Various exemplary embodiments of the present invention will be described in detail below with reference to the drawings. It should be noted that the exemplary embodiments disclosed herein are not intended to limit the scope of the claimed invention and that not every combination of features described in the present exemplary embodiments is always essential to the technical solution of the invention.

An information processing apparatus and a communication apparatus of a communication system according to a first exemplary embodiment will be described below. While a personal computer (PC) is described as an example of the information processing apparatus according to the present exemplary embodiment, the information processing apparatus is not limited to the PC. Various information processing apparatuses such as a mobile terminal, smartphone, tablet terminal, personal digital assistant (PDA), and digital camera are applicable. Further, while a printer is described as an example of the communication apparatus according to the present exemplary embodiment, the communication apparatus is not limited to the printer, and various apparatuses capable of wirelessly communicating with the information processing apparatus are applicable. Examples of applicable printers include an inkjet printer, full-color laser beam printer, and monochrome printer. The present invention is also applicable to not only printers but also copy machines, facsimile apparatuses, mobile terminals, smartphones, PCs, tablet terminals, PDAs, digital cameras, music reproduction devices, and televisions. The present invention is also applicable to multi-functional peripherals that include a plurality of functions such as a copy function, a fax function, and a print function.

First, a configuration of the information processing apparatus according to the present exemplary embodiment and a configuration of the communication apparatus configured to communicate with the information processing apparatus according to the present exemplary embodiment will be described below. While the configuration below is described as an example in the present exemplary embodiment, the present exemplary embodiment is applicable to any apparatuses capable of communicating with a communication apparatus, and is not limited to the illustrated features.

Figure 1:
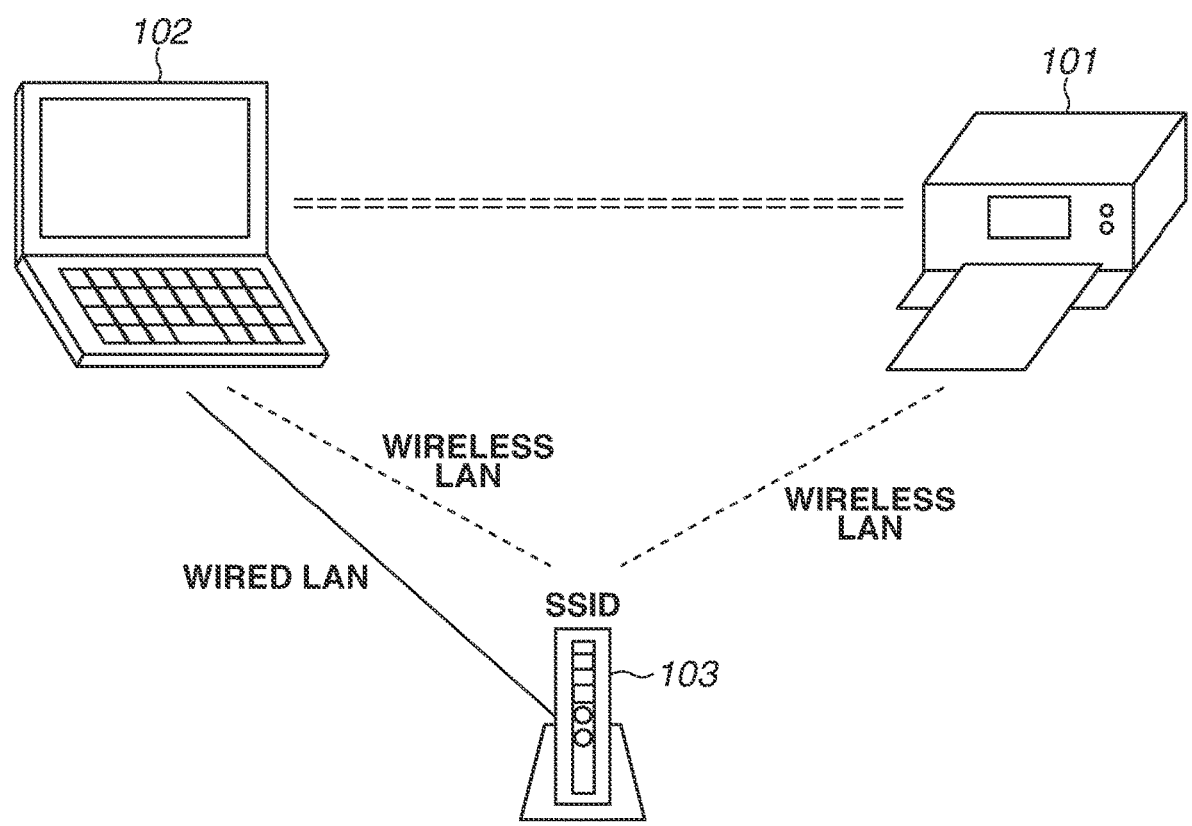
FIG. 1 is a configuration diagram illustrating a communication system.

FIG. 1 is a system configuration diagram according to the present exemplary embodiment. An information processing apparatus 102 is the information processing apparatus according to the present exemplary embodiment. A communication apparatus 101 is the communication apparatus according to the present exemplary embodiment. An access point (AP) 103 is an external apparatus located outside the information processing apparatus 102 and the communication apparatus 101. Alternatively, the external apparatus can be an apparatus that can relay communication other than an AP. Specifically, the AP 103 is, for example, a wireless local area network router (wireless LAN router).

The information processing apparatus 102 and the communication apparatus 101 are connectable to the AP 103. The information processing apparatus 102 can communicate with the communication apparatus 101 via the AP 103. A method of connecting a terminal apparatus and a communication apparatus via an AP as described above is generally referred to as "infrastructure connection". In the infrastructure connection, a network environment where a plurality of devices can communicate with one another is established. On the contrary, a method of directly connecting a terminal apparatus and a communication apparatus together (i.e., without an AP therebetween) is referred to as "direct connection".

In the present exemplary embodiment, the infrastructure connection and the direct connection between the information processing apparatus 102 and the communication apparatus 101 are a connection established by a communication method based on the Institute of Electrical and Electronics Engineers (IEEE) 802.11 series standards. The communication method based on the IEEE 802.11 series standards is specifically Wi-Fi®. A communication method for use in the connections is not limited to those described above and, for example, Bluetooth® or Wi-Fi Aware can be used.

Figure 2:
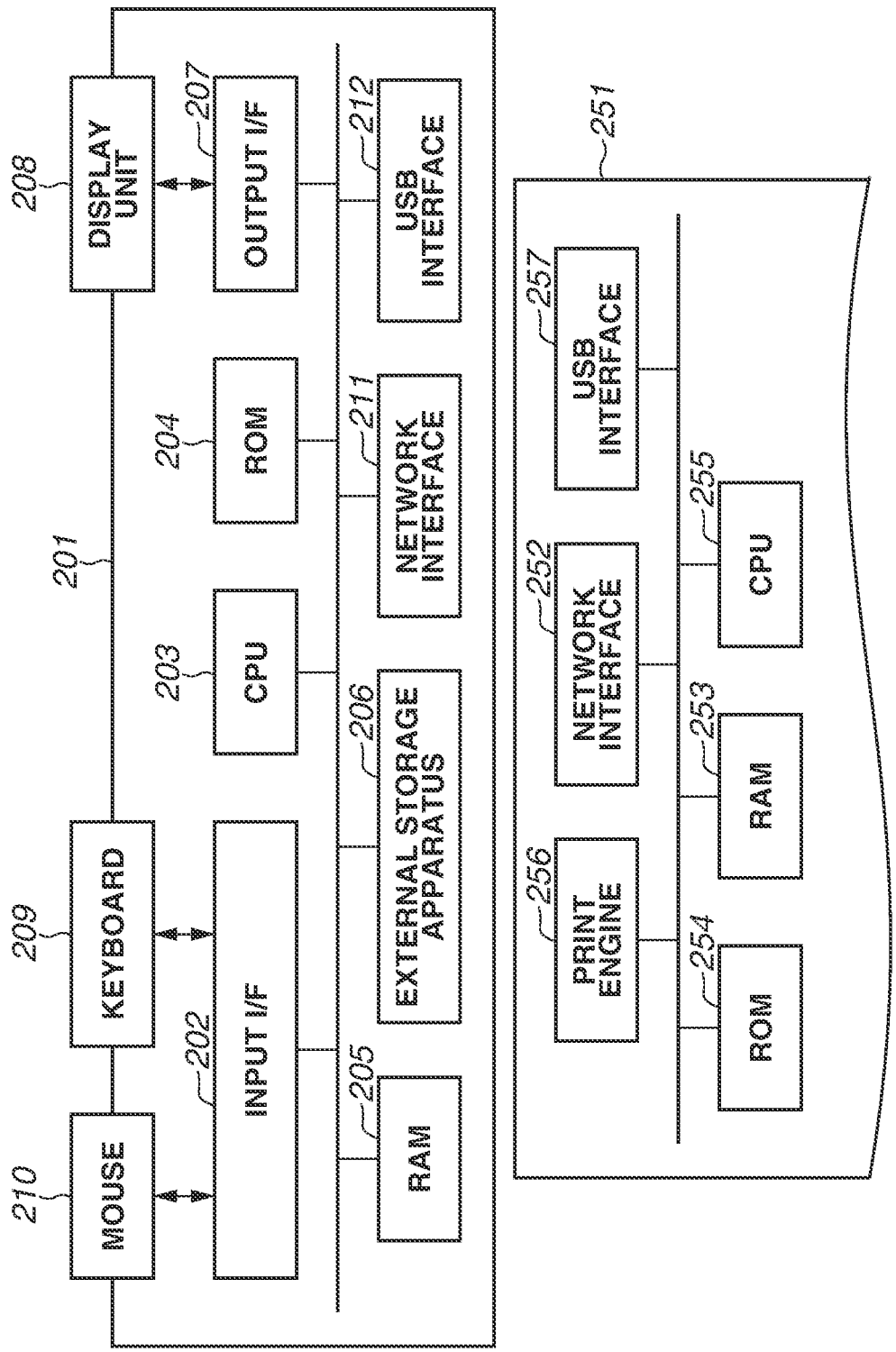
FIG. 2 is a hardware configuration diagram illustrating an information processing apparatus and a communication apparatus.

Hardware configurations of the information processing apparatus 102 and the communication apparatus 101 will be described below with reference to a block diagram in FIG. 2. While the configuration below is described as an example in the present exemplary embodiment, the illustrated functions are not intended to limit the present exemplary embodiment.

The information processing apparatus 102 includes an input interface (input I/F) 202, a central processing unit (CPU) 203, a read-only memory (ROM) 204, a random access memory (RAM) 205, an external storage apparatus 206, an output interface (output I/F) 207, a display unit 208, a keyboard 209, and a mouse 210. The CPU 203, the ROM 204, and the RAM 205 form a computer of the information processing apparatus 102. The information processing apparatus 102 further includes a network interface (first communication unit) 211 and a universal serial bus (USB) interface (second communication unit) 212.

The input I/F 202 is an interface configured to receive data input and an operation instruction from a user when the mouse 210 or the keyboard 209 is operated.

The CPU 203 is a system control unit and is a processor configured to control the entire information processing apparatus 102.

The ROM 204 stores fixed data such as a control program, data table, and embedded operating system (hereinafter, referred to as "OS") program to be executed by the CPU 203. In the present exemplary embodiment, each control program stored in the ROM 204 controls software execution such as scheduling, task switching, and interruption processing under management by the embedded OS stored in the ROM 204.

The RAM 205 is a static RAM (SRAM) that requires a backup power source. The RAM 205 stores data using a primary battery (not illustrated) for data backup so that important data such as a program control variable number is retained without being lost. Further, the RAM 205 includes a memory area configured to store setting information about the information processing apparatus 102 and management data of the information processing apparatus 102. Further, the RAM 205 is also used as a main memory and a work memory of the CPU 203.

The external storage apparatus 206 stores an application configured to provide a print execution function and a print job generation program configured to generate a print job that is interpretable by the communication apparatus 101. Further, the external storage apparatus 206 stores various programs such as a program for controlling transmission and reception of information to and from the communication apparatus 101 connected via the network interface 211 or the USB interface 212 and various types of information for use in the programs. A program for setup described below is also stored on the external storage apparatus 206.

The output I/F 207 is an interface configured to control the display unit 208 to display data and a notification of the state of the information processing apparatus 102.

The display unit 208 includes a light emitting diode (LED) and a liquid crystal display (LCD) and displays data and a notification of the state of the information processing apparatus 102. An operation unit such as number input keys, a mode setting key, an enter key, a cancel key, and a power key can be provided on the display unit 208 to receive user input via the display unit 208.

The network interface 211 controls wireless communication and wired communication via a LAN cable. Specifically, the network interface 211 connects to the communication apparatus 101 and/or an external apparatus located outside the information processing apparatus 102 and the communication apparatus 101 wirelessly or via a wired LAN and executes data communication. For example, the network interface 211 is connectable to an AP (not illustrated) in the communication apparatus 101. The network interface 211 and the AP in the communication apparatus 101 are connected so that the information processing apparatus 102 and the communication apparatus 101 can communicate with each other. The network interface 211 can communicate with the communication apparatus 101 either directly via wireless communication or via an external apparatus located outside the information processing apparatus 102 and the communication apparatus 101. The external apparatus includes an external AP or an apparatus capable of relaying communication other than an AP. While the IEEE 802.11 series standards (Wi-Fi®) are used in the present exemplary embodiment, Bluetooth®, for example, can be used. Examples of wireless communication methods include Wi-Fi® and Bluetooth®. Further, examples of an external AP include a router apparatus, and the like. In the present exemplary embodiment, a method of connecting the information processing apparatus 102 and the communication apparatus 101 directly without an external AP is referred to as a "direct connection method". Further, a method of connecting the information processing apparatus 102 and the communication apparatus 101 via an external AP is referred to as an "infrastructure connection method". The information processing apparatus 102 can include a plurality of network interfaces 211 to perform communication using a plurality of communication methods. Specifically, the information processing apparatus 102 can include interfaces that perform communication using short-range wireless communication methods such as Bluetooth Low Energy®, near-field communication (NFC), and Wi-Fi Aware. Further, the information processing apparatus 102 does not have to include the network interface 211 for wireless communication. Specifically, the information processing apparatus 102 can include only the network interface 211 for wired communication and the USB interface 212 described below as interfaces for communicating with another apparatus.

The USB interface 212 controls USB connections via a USB cable. Specifically, the USB interface 212 connects to the communication apparatus 101 and an apparatus such as an external AP via a USB connection and executes data communication.

The communication apparatus 101 includes a network interface (communication unit) 252, a RAM 253, a print engine 256, a ROM 254, a CPU 255, and a USB interface 257. The CPU 255, the RAM 253, and the ROM 254 form a computer of the communication apparatus 101.

The network interface 252 controls wireless communication and wired communication processing via a LAN cable. Specifically, the network interface 252 includes an AP for connecting to an apparatus such as the information processing apparatus 102 as an internal AP of the communication apparatus 101. The AP is connectable to the network interface 211 of the information processing apparatus 102. The network interface 252 can communicate with the information processing apparatus 102 either directly via wireless communication or via an external AP. Specifically, the network interface 252 can operate not only as an AP but also as a child device configured to connect to an external AP. While the IEEE 802.11 series standards (Wi-Fi®) are used in the present exemplary embodiment, Bluetooth®, for example, can be used. Further, the network interface 252 can include hardware configured to function as an AP or can operate as an AP using software that causes the network interface 252 to function as an AP. The communication apparatus 101 can include a plurality of network interfaces 252 to perform communication using a plurality of communication methods. Specifically, the communication apparatus 101 can include interfaces that perform communication using short-range wireless communication methods such as Bluetooth Low Energy, NFC, and Wi-Fi Aware.

The RAM 253 is an SRAM that requires a backup power source. The RAM 253 stores data using a primary battery (not illustrated) for data backup so that important data such as a program control variable number is retained without being lost. Further, the RAM 253 includes a memory area configured to store setting information about the communication apparatus 101 and management data of the communication apparatus 101. Further, the RAM 253 is also used as a main memory and a work memory of the CPU 255 and stores a reception buffer and various types of information. The reception buffer temporarily stores print information received from the information processing apparatus 102.

The ROM 254 stores fixed data such as a control program, data table, and OS program to be executed by the CPU 255. In the present exemplary embodiment, each control program stored in the ROM 254 controls software execution such as scheduling, task switching, and interruption processing under management by the embedded OS stored in the ROM 254.

The CPU 255 is a system control unit and is a processor configured to control the entire communication apparatus 101.

The print engine 256 executes image forming processing to form an image on a recording medium, such as a sheet, by applying a recording agent, such as ink, onto the recording medium based on information stored in the RAM 253 or a print job received from the information processing apparatus 102 and outputs a print result. The term "print job" refers to a job that causes the communication apparatus 101 to execute image forming processing.

In the present exemplary embodiment, the communication apparatus 101 uses at least one of 2.4 GHz and 5 GHz frequency bands in wireless connection based on the IEEE 802.11 series standards. The communication apparatus 101 includes communication channels corresponding to the frequency bands available for use. For example, in a case where the 2.4 GHz frequency band is available for use, the communication apparatus 101 includes 14 communication channels assigned to a predetermined frequency band of the 2.4 GHz frequency band. Further, in a case where, for example, the 5 GHz frequency band is available for use, the communication apparatus 101 includes 19 communication channels assigned to a predetermined frequency band of the 5 GHz frequency band.

While the case where the information processing apparatus 102 and the communication apparatus 101 share the processing as described above is described as an example, the sharing form is not limited to that described above, and any other forms can be employed.

<Wi-Fi® Communication (Infrastructure Mode)>

In order to establish a connection using the infrastructure method (hereinafter, "infrastructure connection") in Wi-Fi® communication, the communication apparatus 101 according to the present exemplary embodiment operates in an infrastructure mode. In the present exemplary embodiment, the term "infrastructure connection" refers to a form of connection of the communication apparatus 101 and the information processing apparatus 102 via an external apparatus that overall controls a network and operates as a parent device, such as the AP 103. When operating in the infrastructure mode, the communication apparatus 101 operates as a child device in the network to which the communication apparatus 101 belongs.

In the infrastructure mode, the communication apparatus 101 and the information processing apparatus 102 are connected via the AP 103 and can communicate via the AP 103. The channels for use in communication in the infrastructure mode can correspond to a frequency band (5.0 Ghz band) other than 2.4 Ghz.

<Network Setting Processing>

In the present exemplary embodiment, the information processing apparatus 102 executes network setting (connection setting) to cause the communication apparatus 101 to operate in the infrastructure mode using wireless communication with the communication apparatus 101. The information processing apparatus 102 executes network setting processing using an application program (program for setup) for executing the network setting installed in the information processing apparatus 102. The network setting processing can be executed not wirelessly but via wires or cables.

In a case where the AP 103 and the communication apparatus 101 are to be connected and the communication apparatus 101 is to operate in the infrastructure mode, the information processing apparatus 102 transmits an infrastructure setting command to cause the communication apparatus 101 to operate in the infrastructure mode to the communication apparatus 101. The infrastructure setting command is, for example, information about the AP 103. The information about the AP 103 is, for example, a service set identifier (SSID) of the AP 103 and a password for connecting to the AP 103.

In the present exemplary embodiment, the infrastructure setting command is transmitted in network setting processing using a peer-to-peer (P2P) connection for network setting processing between the information processing apparatus 102 and the communication apparatus 101. Further, there are two P2P connections for network setting processing in the present exemplary embodiment, a Wi-Fi® connection and a Bluetooth Low Energy connection. A communication method other than Wi-Fi® and Bluetooth Low Energy, such as Classic Bluetooth®, can be used as a P2P connection for network setting processing.

After a Wi-Fi® infrastructure connection or a Wi-Fi® P2P connection is established between the information processing apparatus 102 and the communication apparatus 101 by network setting processing, the information processing apparatus 102 and the communication apparatus 101 can communicate via the established connection. Specifically, for example, the information processing apparatus 102 can transmit a print job of causing the communication apparatus 101 to execute printing or a scan job of causing the communication apparatus 101 to execute scanning to the communication apparatus 101 via the established connection.

Meanwhile, an example of a method for identifying an AP that is a connection destination of the communication apparatus 101 in network setting processing is as follows. Specifically, the communication apparatus 101 searches for one or more APs near the communication apparatus 101 using the communication channels available for use by the communication apparatus 101, and a connection destination of the communication apparatus 101 is identified from the AP(s) detected by the search. In this method, the communication apparatus 101 performs searching a plurality of times using each one of the plurality of communication channels available for use by the communication apparatus 101. This search is time-consuming, so that the method has an issue that it takes time to complete network setting processing.

Thus, in the present exemplary embodiment, a form that can reduce the time taken to complete network setting processing will be described below.

Figure 3:
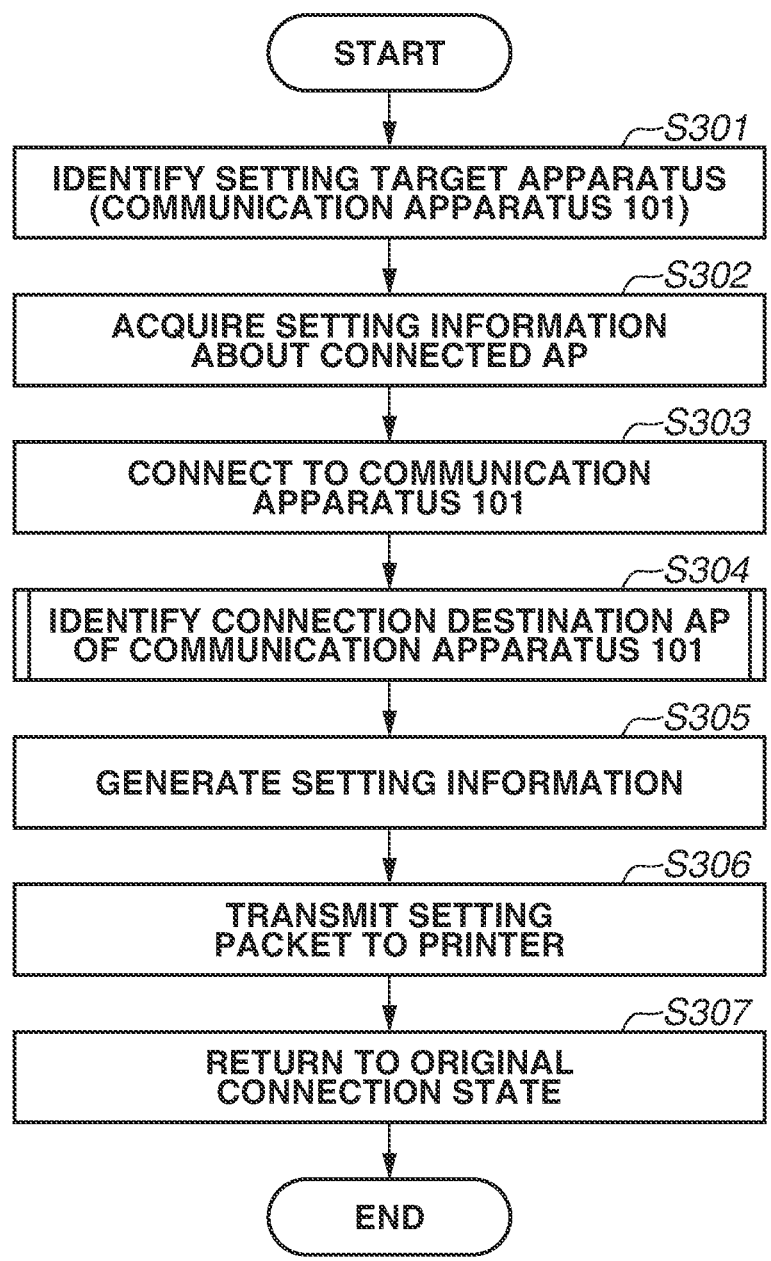
FIG. 3 is a flowchart illustrating network setting processing.

FIG. 3 is a flowchart illustrating network setting processing executed by the information processing apparatus 102. For example, the CPU 203 reads a program stored in the ROM 204 or the external storage apparatus 206 onto the RAM 205 and executes the read program to thereby realize the flowchart illustrated in FIG. 3. Specifically, the process illustrated in the flowchart in FIG. 3 is realized by the program for setup. Further, the process illustrated in the flowchart in FIG. 3 is started in a case where a user operation (an instruction to execute network setting processing) that triggers network setting processing is performed on a screen displayed by the program for setup. Further, for example, the process illustrated in the flowchart in FIG. 3 is started when the program for setup is activated.

First, in step S301, the CPU 203 identifies a network setting processing target apparatus. Specifically, the CPU 203 searches for candidate network setting processing target apparatuses by acquiring information about apparatuses near the information processing apparatus 102 using an application program interface (API) of the OS of the information processing apparatus 102. More specifically, the CPU 203 acquires information about each apparatus detected by the network interface 211 and each apparatus connected by the USB interface 212. The search executed by the network interface 211 is referred to as "AP search" and is the processing of searching for APs near the information processing apparatus 102. The information acquired at this time is information about a frequency band, encryption method, and communication channel used by the apparatus. Then, the CPU 203 displays a candidate network setting processing target apparatus list on the display unit 208 using the acquired information. The network interface 211 searches for, for example, an apparatus operating as an AP having specific identification information. In the present exemplary embodiment, a user operates the communication apparatus 101 so that the communication apparatus 101 operates in a predetermined mode referred to as a "setup mode" in a case where network setting processing is to be executed on the communication apparatus 101. The setup mode is a mode in which the communication apparatus 101 can receive network setting processing and the communication apparatus 101 operates as a predetermined AP having a predetermined SSID. In a case where the communication apparatus 101 operates in the setup mode, the network interface 211 detects the communication apparatus 101, so that the communication apparatus 101 is displayed on the list. If a user selects the communication apparatus 101 from the displayed list, the CPU 203 identifies the communication apparatus 101 as a network setting processing target apparatus. The search for candidate network setting processing target apparatuses can be executed using Wi-Fi® or Bluetooth Low Energy. Further, only the apparatuses having a predetermined SSID among the detected candidates can be displayed on the list. Further, in a case where only one of the detected candidate apparatuses has a predetermined SSID, a network setting processing target apparatus can be identified without displaying the candidates.

Next, in step S302, the CPU 203 transmits a request to the AP 103 that is wirelessly connected to the information processing apparatus 102, and the CPU 203 acquires setting information about the AP 103. The setting information about the AP 103 is, for example, setting information (SSID, password) for connecting to the AP 103 and information about a frequency band, encryption method, and communication channel used by the AP 103. The AP 103 that is wirelessly connected to the information processing apparatus 102 at this time is an AP connected to the information processing apparatus 102 at least at the time of the issuance of an instruction to execute network setting processing. Further, in the present exemplary embodiment, the AP 103 includes a communication channel corresponding to at least one of the 2.4 GHz and 5 GHz frequency bands and uses the communication channel in wireless connection.

In step S303, the CPU 203 wirelessly connects the communication apparatus 101 identified in step S301 to the information processing apparatus 102. At this time, the wireless connection can be established using either one of Wi-Fi® and Bluetooth Low Energy. In a case where the CPU 203 is to establish a Wi-Fi® wireless connection at this time, the Wi-Fi® wireless connection with the AP 103 is to be disconnected. Thus, the CPU 203 stores the setting information about the AP 103 and then changes the Wi-Fi® wireless connection destination from the AP 103 to the communication apparatus 101. On the other hand, in a case where the CPU 203 is to establish a Bluetooth Low Energy wireless connection, the Wi-Fi® wireless connection with the AP 103 is not to be disconnected. Further, in a case where the communication apparatus 101 is wire-connected to the information processing apparatus 102, the processing is skipped.

In step S304, the CPU 203 identifies the AP 103 that is a connection destination of the communication apparatus 101. Details of this processing will be described below with reference to FIG. 4.

Figure 4:
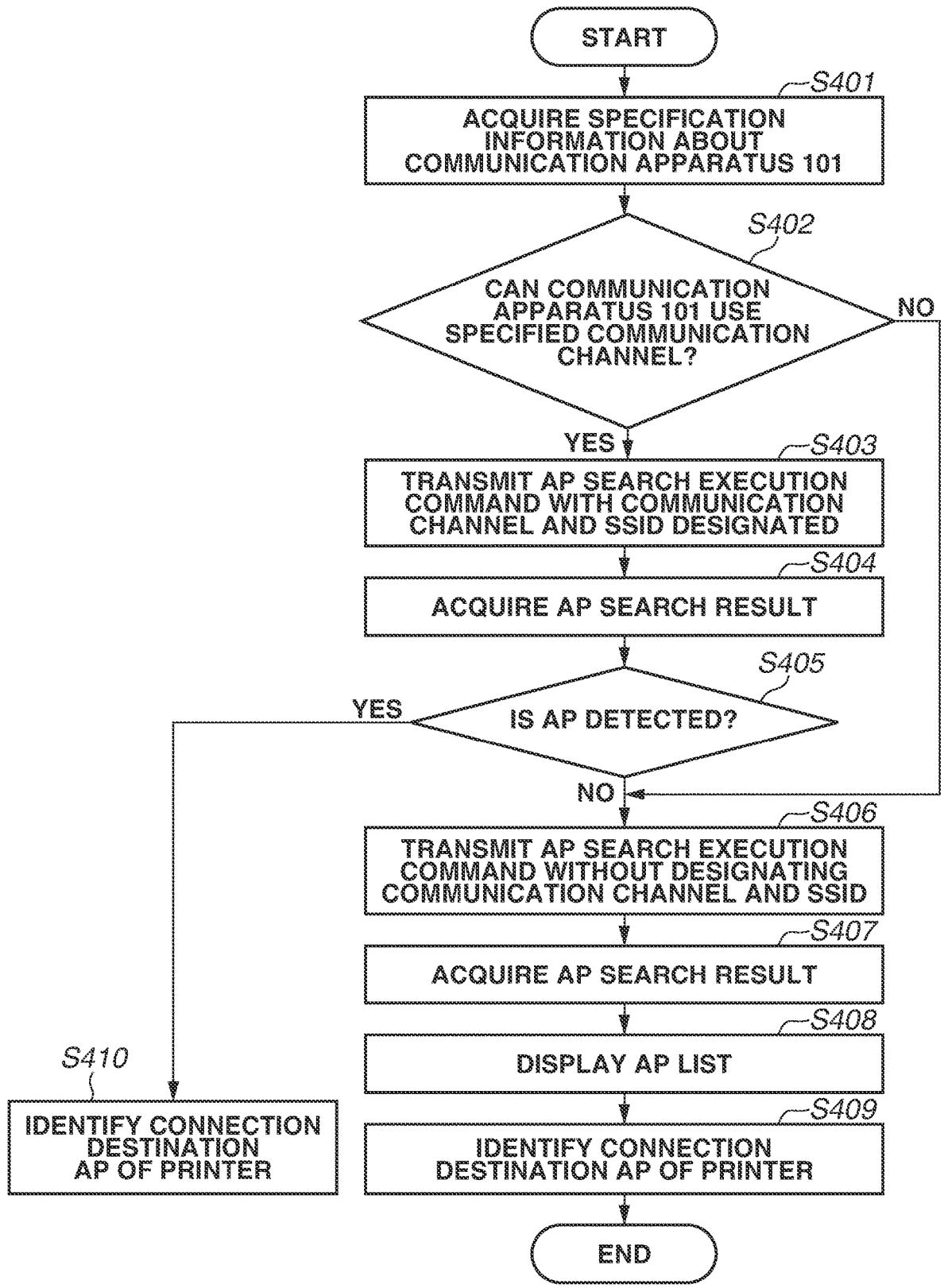
FIG. 4 is a flowchart illustrating a process of identifying an access point (AP) that is a connection destination of the communication apparatus.

FIG. 4 is a flowchart illustrating a process of identifying the AP 103 that is a connection destination of the communication apparatus 101. The process is executed by the information processing apparatus 102. The process illustrated in the flowchart in FIG. 4 is executed as the processing of step S304 in the process illustrated in the flowchart in FIG. 3.

First, in step S401, the CPU 203 acquires specification information about the communication apparatus 101 from the communication apparatus 101. The specification information about the communication apparatus 101 contains information about frequency bands and communication channels available for use by the communication apparatus 101, destination information about the communication apparatus 101, and current setting information about the communication apparatus 101. The specification information about the communication apparatus 101 can be acquired from the communication apparatus 101 or from a server outside the communication apparatus 101.

In step S402, the CPU 203 determines whether the communication apparatus 101 can use the communication channel specified by the information acquired in step S302. Specifically, the CPU 203 determines whether the communication channel specified by the information acquired in step S302 is included in the communication channel specified by the information acquired in step S401. The communication channel specified by the information acquired in step S302 refers to a communication channel available for use by the AP 103 to which the information processing apparatus 102 has been (or is) connected. The communication channel specified by the information acquired in step S401 is a communication channel available for use by the communication apparatus 101. For example, in a case where the communication channel specified by the information acquired in step S302 is a communication channel corresponding to the 5 GHz frequency band and the communication channel specified by the information acquired in step S401 is a communication channel corresponding to the 2.4 GHz frequency band, the determination result is "NO". On the other hand, in a case where the communication channel specified by the information acquired in step S302 and the communication channel specified by the information acquired in step S401 are both a communication channel corresponding to the 5 GHz frequency band, the determination result is "YES". The determination herein may be about a frequency band available for use by the apparatus instead of a communication channel available for use by the apparatus. In a case where the determination of "YES" is performed (YES in step S402), the processing proceeds to step S403. On the other hand, in a case where the determination of "NO" is performed (NO in step S402), the processing proceeds to step S406 without executing steps S403 to S405.

In step S403, the CPU 203 transmits an AP search execution command to search for the AP 103 near the communication apparatus 101 to the communication apparatus 101.

Condition information about AP search execution processing can be added to the AP search execution command. Specifically, for example, the CPU 203 can designate a communication channel or frequency band for use in a search so that the communication apparatus 101 executes an AP search using only the designated communication channel or the designated frequency band. In a case where the CPU 203 does not designate a communication channel or frequency band for use in the search, the communication apparatus 101 executes an AP search using every communication channel of the communication apparatus 101. In general, the greater the number of communication channels used in a search is, the longer the time taken to complete the search becomes. Thus, the execution time of an AP search is shorter in a case where a communication channel or frequency band for use in the search is designated than in a case where a communication channel or frequency band for use in the search is not designated.

Further, for example, the CPU 203 can designate an SSID of a search target AP so that an AP search for an AP having the designated SSID is executed. In a case where an SSID of a search target AP is designated, active scanning is executed as an AP search. Active scanning is a method in which information for acquiring a response from an AP having a designated SSID is broadcast and the AP from which a response is received is detected. On the other hand, in a case where an SSID of a search target AP is not designated, passive scanning is executed as an AP search. Passive scanning is a method of detecting a single or plurality of APs near an apparatus executing an AP search by receiving a beacon transmitted from the single or plurality of APs.

In the present exemplary embodiment, in step S403, the CPU 203 designates a communication channel that is specified by the information acquired in step S302 and also by the information acquired in step S401 (i.e., a communication channel available for use by both the AP 103 and the communication apparatus 101). Further, in step S403, the CPU 203 designates the SSID specified by the information acquired in step S302. Specifically, the CPU 203 causes the communication apparatus 101 to search for the AP 103 to which the information processing apparatus 102 has been (or is) connected.

In a case where the communication apparatus 101 receives the command transmitted in step S403, the communication apparatus 101 executes an AP search based on the designated condition. Specifically, for example, the communication apparatus 101 executes an AP search using the designated communication channel among the communication channels available for use by the communication apparatus 101 and without using the communication channels other than the designated communication channel. Since the communication channel to be used is designated, the communication apparatus 101 can complete execution of an AP search in a shorter length of time than an AP search executed using every communication channel. Specifically, the communication apparatus 101 broadcasts information for acquiring a response from an AP having the designated SSID using the designated communication channel and determines whether a response is acquired (whether the AP is detected).

The AP search condition designated by the command transmitted in step S403 is not limited to the form described above. In the present exemplary embodiment, at least one communication channel including a communication channel used by an AP connected to the information processing apparatus 102 at the time of at least the issuance of an instruction to execute network setting processing is to be designated. Thus, for example, a plurality of communication channels corresponding to a frequency band used by an AP connected to the information processing apparatus 102 at the time of at least the issuance of an instruction to execute network setting processing can be designated.

In step S404, the CPU 203 acquires a result of the AP search executed by the communication apparatus 101 based on the command transmitted in step S403 from the communication apparatus 101.

In step S405, the CPU 203 determines whether an AP having the SSID designated to the communication apparatus 101 is detected by the AP search executed by the communication apparatus 101 based on the command transmitted in step S403, based on the result acquired in step S404. In a case where the CPU 203 determines that an AP having the designated SSID is detected (YES in step S405), the processing proceeds to step S410. On the other hand, in a case where the CPU 203 determines that an AP having the designated SSID is not detected (NO in step S405), the processing proceeds to step S406.

In step S406, the CPU 203 transmits an AP search execution command to cause the communication apparatus 101 to execute an AP search using every communication channel available for use by the communication apparatus 101. Thus, the CPU 203 transmits the AP search execution command in step S406 without designating a frequency band or communication channel to be used. Further, the CPU 203 transmits the AP search execution command in step S406 without designating an SSID of a search target AP. Specifically, the CPU 203 transmits an AP search execution command to cause the communication apparatus 101 to execute passive scanning.

In a case where the communication apparatus 101 receives the transmitted AP search execution command, the communication apparatus 101 executes passive scanning using every communication channel available for use by the communication apparatus 101. This detects an AP near the communication apparatus 101.

The AP search condition designated by the command transmitted in step S406 is not limited to the form described above. In the present exemplary embodiment, the condition is to be designated so that the AP search is executed using at least one communication channel other than the communication channel designated by the command transmitted in step S403. Thus, for example, the condition can be designated so that the AP search is executed using the at least one other communication channel without using the communication channel designated by the command transmitted in step S403. In step S407, the CPU 203 acquires a result of the AP search executed by the communication apparatus 101 based on the command transmitted in step S406 from the communication apparatus 101. The search result contains setting information about the AP detected by the AP search.

Figure 5:
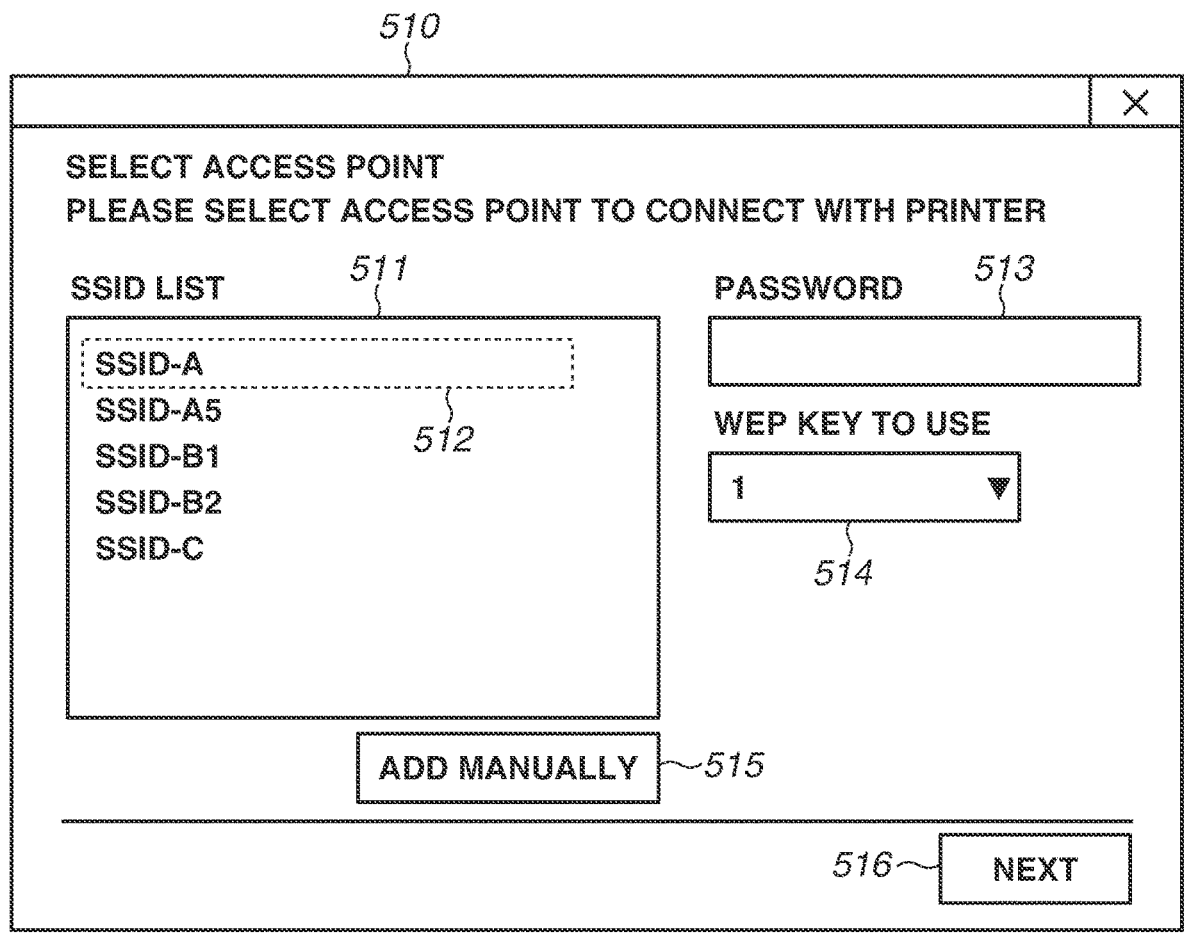
FIG. 5 illustrates an example of a selection screen.

In step S408, the CPU 203 displays a list of APs detected by the AP search executed by the communication apparatus 101 based on the command transmitted in step S406, based on the result acquired in step S407. Then, the CPU 203 receives a user-selected AP from the list. FIG. 5 illustrates an example of a selection screen displayed here. On an AP selection screen 510, a list region 511 displays a list of APs detected by the AP search executed by the communication apparatus 101 based on the command transmitted in step S406. A broken line 512 is a mark indicating a selected AP. An input region 513 is a region configured to receive input of a password for connecting to the selected AP. A selection region 514 is a region configured to receive selection of an encryption method for use in connecting to the selected AP. An ADD button 515 is a button for adding an AP other than the listed APs to the list region 511. In a case where the ADD button 515 is pressed, an addition screen for inputting an SSID of a selection target AP is displayed, and an SSID input to the addition screen is added to the list region 511. In a case where a NEXT button 516 is pressed, the processing proceeds to step S409.

In step S409, the CPU 203 identifies the AP selected on the AP selection screen 510 in step S408 as an AP that is a connection destination of the communication apparatus 101. Then, the processing proceeds to step S305.

In step S410, the CPU 203 identifies the AP detected by the AP search executed by the communication apparatus 101 based on the command transmitted in step S403 as an AP that is a connection destination of the communication apparatus 101. In a case where a plurality of APs is detected by the AP search executed by the communication apparatus 101 based on the command transmitted in step S403, the CPU 203 identifies one of the plurality of detected APs. In the present exemplary embodiment, the first-detected AP among the plurality of detected APs is identified, but the present exemplary embodiment is not limited to this form. Alternatively, a list of a plurality of detected APs is displayed, and selection of one of the APs is received from a user, and the selected AP is identified. Then, the processing proceeds to step S305.

In step S305, the CPU 203 generates setting information about the AP identified in step S304. Specific examples of setting information generated in step S305 include information about an SSID of the AP identified in step S304 and a password for connecting to the AP identified in step S304. Other examples include information about a frequency band or communication channel used by the AP identified in step S304 and an encryption method for use in connecting to the AP identified in step S304. The CPU 203 generates setting information based on the information acquired from the OS in step S302, the information acquired from the communication apparatus 101 in step S407, and the information input to the AP selection screen 510. In a case where an AP connected at the time of the reception of an instruction to execute network setting processing from a user is identified in step S304, the CPU 203 can acquire a password for connecting to the AP from the OS. Alternatively, the CPU 203 can display a screen configured to receive input of a password from a user using the program for setup.

In step S306, the CPU 203 transmits the setting information generated in step S305 to the communication apparatus 101. The communication apparatus 101 having received the setting information establishes a Wi-Fi® connection with the AP identified in step S304 using the setting information. Specifically, the communication apparatus 101 performs active scanning to search for an AP having the SSID designated by the setting information using the frequency band or communication channel designated by the setting information. In a case where an AP is detected by the search, a Wi-Fi® connection is established with the AP using the password and encryption method designated by the setting information.

In step S307, the CPU 203 disconnects the connection with the communication apparatus 101 and returns to the previous connection state before the establishment of the connection with the communication apparatus 101. Specifically, the CPU 203 re-establishes a connection with the AP connected at the time of the reception of an instruction to execute network setting processing from a user based on the information acquired in step S302. This processing is skipped in a case where the connection with the AP is maintained by connecting to the communication apparatus 101 via Bluetooth Low Energy or USB. Thereafter, the CPU 203 completes network setting processing, and the process illustrated in the flowchart ends.

As described above, in the present exemplary embodiment, an AP detected by the AP search by the communication apparatus 101 is identified as a connection destination of the communication apparatus 101 that is set by network setting processing. Thus, with the network setting processing, the communication apparatus 101 is prevented from not being able to connect to an AP when the processing of connecting the communication apparatus 101 to the AP is executed.

Further, in the present exemplary embodiment, the CPU 203 causes the communication apparatus 101 to execute an AP search using only the communication channel used by an AP connected to the information processing apparatus 102 at the time of the reception of an instruction to execute network setting processing from a user. Then, in a case where the AP is detected by the AP search, the CPU 203 controls the communication apparatus 101 to not execute an AP search using the plurality of communication channels. This reduces (shortens) the time taken to execute network setting processing in the present exemplary embodiment. Further, in a case where the AP is not detected by the AP search, the CPU 203 causes the communication apparatus 101 to execute an AP search using the plurality of communication channels. Thus, in a case where the AP connected to the information processing apparatus 102 cannot be set as a connection destination of the communication apparatus 101, more APs that are candidate connection destinations of the communication apparatus 101 are detected.

There is a case where a wireless router operating as an AP connected to the information processing apparatus 102 at the time of the reception of an instruction to execute network setting processing from a user can use a plurality of frequency bands. Further, there is a case where, for example, the wireless router includes a second AP (AP 2) that has the same SSID and password as an AP (AP 1) connected to the information processing apparatus 102 but uses a different frequency band. Further, there is a case where the wireless router includes a function of relaying communication between an apparatus connected to the AP 1 and an apparatus connected to the AP 2. Specifically, in a case where, for example, the AP 1 uses a communication channel corresponding to the 5 GHz frequency band and the communication apparatus 101 supports only the 2.4 GHz frequency band, if the communication apparatus 101 connects to the AP 2, the information processing apparatus 102 and the communication apparatus 101 can communicate with each other.

Thus, in the present exemplary embodiment, a form will be described below that improves convenience of network setting processing in a case where the communication apparatus 101 cannot use the communication channel used by the AP connected to the information processing apparatus 102.

A communication system similar to that in the first exemplary embodiment is used in the second exemplary embodiment, and those that are not described are similar to those in the first exemplary embodiment.

FIG. 6 is a flowchart illustrating a process of identifying the AP 103 that is a connection destination of the communication apparatus 101. The process is executed by the information processing apparatus 102. The process illustrated in the flowchart in FIG. 6 is executed as the processing of step S304 in the process illustrated in the flowchart in FIG. 3.

Steps S601 to S610 are similar to steps S401 to S410, so that descriptions thereof are omitted.

In step S611, the CPU 203 executes an AP search by passive scanning using a frequency band that is available for use by the communication apparatus 101 and is different from the frequency band used by the AP connected to the information processing apparatus 102. The frequency band available for use by the communication apparatus 101 is identified based on the specification information about the communication apparatus 101 that is acquired in step S601. Further, the frequency band used by the AP connected to the information processing apparatus 102 is identified based on the information acquired in step S302. The timing to execute the AP search is not particularly limited. For example, an AP search using a frequency band that is available for use by the communication apparatus 101 and is different from the frequency band used by the AP connected to the information processing apparatus 102 can be executed in the AP search executed in step S301.

In step S612, the CPU 203 determines whether a specific AP is contained in a list of APs detected by the AP search executed in step S611. The specific AP is an AP that uses a communication channel different from the communication channel used by the AP connected to the information processing apparatus 102 and has the same SSID as the AP connected to the information processing apparatus 102. The SSID of the AP connected to the information processing apparatus 102 is identified based on the information acquired in step S302. In a case where the CPU 203 determines that the specific AP is contained (YES in step S612), the processing proceeds to step S613. On the other hand, in a case where the CPU 203 determines that the specific AP is not contained (NO in step S612), the processing proceeds to step S606.

In step S613, the CPU 203 transmits an AP search execution command to the communication apparatus 101. At this time, a communication channel used by an AP having the same SSID as the AP connected to the information processing apparatus 102 is designated as a communication channel to be used in the AP search. Further, the same SSID as the AP connected to the information processing apparatus 102 is designated as an SSID to be detected by the AP search.

In step S614, the CPU 203 acquires a result of the AP search executed by the communication apparatus 101 based on the command transmitted in step S613 from the communication apparatus 101.

In step S615, the CPU 203 determines whether an AP having the SSID designated to the communication apparatus 101 is detected by the AP search executed by the communication apparatus 101 based on the command transmitted in step S613, based on the result acquired in step S614. In a case where the AP is located far from the communication apparatus 101 or there is an obstacle between the AP and the communication apparatus 101, the AP may not be detected by the communication apparatus 101. In a case where the CPU 203 determines that an AP having the designated SSID is detected (YES in step S615), the processing proceeds to step S616. On the other hand, in a case where the CPU 203 determines that an AP having the designated SSID is not detected (NO in step S615), the processing proceeds to step S606.

In a case where, for example, the wireless router connected to the information processing apparatus 102 is a tri-band router and includes three or more APs, a plurality of specific APs may be detected by the AP search executed by the information processing apparatus 102 in step S611. In this case, in step S613, the CPU 203 designates a communication channel used by one of the plurality of specific APs and an SSID of the one of the plurality of specific APs and transmits an AP search execution command. Then, in step S615, in a case where the CPU 203 determines that an AP having the designated SSID is not detected (NO in step S615), the processing returns to step S613, and the CPU 203 designates a undesignated communication channel used by an specific AP and a undesignated SSID of the AP and transmits an AP search execution command.

In step S616, the CPU 203 identifies the AP having the same SSID as the AP connected to the information processing apparatus 102 as an AP that is a connection destination of the communication apparatus 101. Then, the processing proceeds to step S305.

For example, a single wireless router enables both an AP (AP 1) that uses a communication channel corresponding to the 2.4 GHz frequency band and an AP (AP 2) that uses a communication channel corresponding to the 5 GHz frequency band. Assume that the communication apparatus 101 can use the 2.4 GHz frequency band but cannot use the 5 GHz frequency band. Further, assume that the information processing apparatus 102 is connected to the AP 2. In this situation, the communication apparatus 101 is connected to the AP 1 without executing a time-consuming AP search using a plurality of communication channels in the present exemplary embodiment.

OTHER EXEMPLARY EMBODIMENTS

The present invention is also realized by a process in which a program for realizing one or more functions of the above-described exemplary embodiments is supplied to a system or apparatus via a network or storage medium and a computer of the system or apparatus reads the program and executes the read program. The computer includes a single or plurality of processors or circuits, and in order to read a computer-executable instruction and execute the read instruction, a network of a plurality of separate computers or a plurality of separate processors or circuits may be included.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197981, filed Oct. 30, 2019, which is hereby incorporated by reference herein in its entirety.

What is claimed is:

1. A method of controlling an information processing apparatus configured to communicate with a communication apparatus, the method comprising:

receiving a predetermined operation from a user;

transmitting, based on the reception of the predetermined operation, a first command to cause the communication apparatus to search for a predetermined access point using at least one communication channel including a communication channel used by the predetermined access point among a plurality of communication channels available for use by the communication apparatus and without using at least one other communication channel other than the at least one communication channel among the plurality of communication channels available for use by the communication apparatus, the predetermined access point being connected to the information processing apparatus at least when the predetermined operation is received;

transmitting a second command to cause the communication apparatus to search for one or more access points near the communication apparatus using at least the at least one other communication channel in a case where the predetermined access point is not detected by a search executed by the communication apparatus based on the first command; and performing control so that in a case where the predetermined access point is detected by the search executed by the communication apparatus based on the first command, the predetermined access point and the communication apparatus are connected, whereas in the case where the predetermined access point is not detected by the search executed by the communication apparatus based on the first command, one of at least one access point detected by a search executed by the communication apparatus based on the second command and the communication apparatus are connected.

2. The method according to claim 1, wherein the first command is a command to cause the communication apparatus to search for the predetermined access point using the communication channel used by the predetermined access point among the plurality of communication channels available for use by the communication apparatus and without using a communication channel other than the communication channel used by the predetermined access point among the plurality of communication channels available for use by the communication apparatus.

3. The method according to claim 1, wherein the first command is a command to cause the communication apparatus to search for the predetermined access point using a plurality of communication channels corresponding to a frequency band used by the predetermined access point among the plurality of communication channels available for use by the communication apparatus and without using a communication channel other than the plurality of communication channels among the plurality of communication channels available for use by the communication apparatus.

4. The method according to claim 1, wherein the second command is a command to cause the communication apparatus to search for at least one access point near the communication apparatus using every communication channel available for use by the communication apparatus.

5. The method according to claim 1, further comprising displaying on a display unit a selection screen via which one of the at least one access point detected by the search executed by the communication apparatus based on the second command is to be selected in the case where the predetermined access point is not detected by the search executed by the communication apparatus based on the first command,
wherein an access point selected via the selection screen and the communication apparatus are connected.

6. The method according to claim 1,
wherein in the case where the predetermined access point is detected by the search executed by the communication apparatus based on the first command, information about the predetermined access point is transmitted to the communication apparatus so that the predetermined access point and the communication apparatus are connected, and
wherein in the case where the predetermined access point is not detected by the search executed by the communication apparatus based on the first command, information about one of the at least one access point detected by the search executed by the communication apparatus based on the second command is transmitted to the communication apparatus so that the one of the at least one access point detected by the search executed by the communication apparatus based on the second command and the communication apparatus are connected.

7. The method according to claim 1,
wherein in a case where a predetermined frequency band used by the predetermined access point is available for use by the communication apparatus, the first command is transmitted, the predetermined access point being connected to the information processing apparatus at least when the predetermined operation is received, and
wherein in a case where the predetermined frequency band is not available for use by the communication apparatus, the first command is not transmitted and the second command is transmitted.

8. The method according to claim 1, further comprising:
executing search processing to search for an access point near the information processing apparatus using a communication channel corresponding to a frequency band available for use by the communication apparatus in the case where the predetermined access point is not detected by the search executed by the communication apparatus based on the first command, and
transmitting a third command to cause the communication apparatus to search for an access point having same identification information as identification information about the predetermined access point in a case where at least one access point detected by the search processing includes the access point having the same identification information as the identification information about the predetermined access point,
wherein in a case where the at least one access point detected by the search processing does not include the access point having the same identification information as the identification information about the predetermined access point, the second command is transmitted, and
wherein in a case where the access point having the same identification information as the identification information about the predetermined access point is detected by a search executed by the communication apparatus based on the third command, the access point having the same identification information as the identification information about the predetermined access point and the communication apparatus are connected.

9. The method according to claim 8, wherein the identification information is a service set identifier (SSID).

10. The method according to claim 1, wherein the communication apparatus is a printing apparatus configured to execute printing.

11. The method according to claim 1, wherein the first command and the second command are transmitted to the communication apparatus via Wi-Fi® or Bluetooth®.

12. A communication apparatus configured to communicate with an information processing apparatus, the communication apparatus comprising:
a reception unit configured to receive information about a predetermined access point from the information processing apparatus, the predetermined access point being connected to the information processing apparatus at least when the information processing apparatus receives a predetermined operation from a user;
a first search unit configured to execute first search processing to search for the predetermined access point using at least one communication channel including a communication channel used by the predetermined access point among a plurality of communication channels available for use by the communication apparatus and without using at least one other communication channel other than the at least one communication channel among the plurality of communication channels available for use by the communication apparatus in a case where information about the predetermined access point is received;
a second search unit configured to execute second search processing to search for at least one access point near the communication apparatus using at least the at least one other communication channel in a case where the predetermined access point is not detected by the first search processing; and an establishment unit configured to establish a connection between the predetermined access point and the communication apparatus in a case where the predetermined access point is detected by the first search processing, or establish a connection between one of at least one access point detected by the second search processing and the communication apparatus in the case where the predetermined access point is not detected by the first search processing.

13. The communication apparatus according to claim 12, wherein the first search processing is to search for the predetermined access point using the communication channel used by the predetermined access point among the plurality of communication channels available for use by the communication apparatus and without using a communication channel other than the communication channel used by the predetermined access point among the plurality of communication channels available for use by the communication apparatus.

14. The communication apparatus according to claim 12, wherein the first search processing is to search for the predetermined access point using a plurality of communication channels corresponding to a frequency band used by the predetermined access point among the plurality of communication channels available for use by the communication apparatus and without using a communication channel other than the plurality of communication channels among the plurality of communication channels available for use by the communication apparatus.

15. The communication apparatus according to claim 12, wherein the second search processing is to search for at least one access point near the communication apparatus using every communication channel available for use by the communication apparatus.

16. The communication apparatus according to claim 12, wherein in the case where the predetermined access point is detected by the first search processing, information about the predetermined access point is received from the information processing apparatus so that a connection is established between the predetermined access point and the communication apparatus, and wherein in the case where the predetermined access point is not detected by the first search processing, information about one of the at least one access point detected by the second search processing is transmitted to the communication apparatus so that a connection is established between the one of the at least one access point detected by the second search processing and the communication apparatus.

17. The communication apparatus according to claim 12, wherein if a first command is received from the information processing apparatus, the first search processing is executed, and wherein if a second command different from the first command is received from the information processing apparatus, the second search processing is executed.

18. The communication apparatus according to claim 17, wherein the first command and the second command are received from the information processing apparatus via Wi-Fi® or Bluetooth®.

19. The communication apparatus according to claim 13, wherein if the information about the predetermined access point is received from the information processing apparatus, a connection is established between the predetermined access point and the communication apparatus, and wherein if information about one of the at least one access point detected by the second search processing is received from the information processing apparatus, a connection is established between the one of the at least one access point detected by the second search processing and the communication apparatus.

20. The communication apparatus according to claim 12, further comprising a printing unit configured to execute printing.

* * * * *